April 5, 1960   J. L. McFARLAND   2,931,607
QUICK RELEASE CABLE SUPPORT CLAMP
Filed Oct. 28, 1955
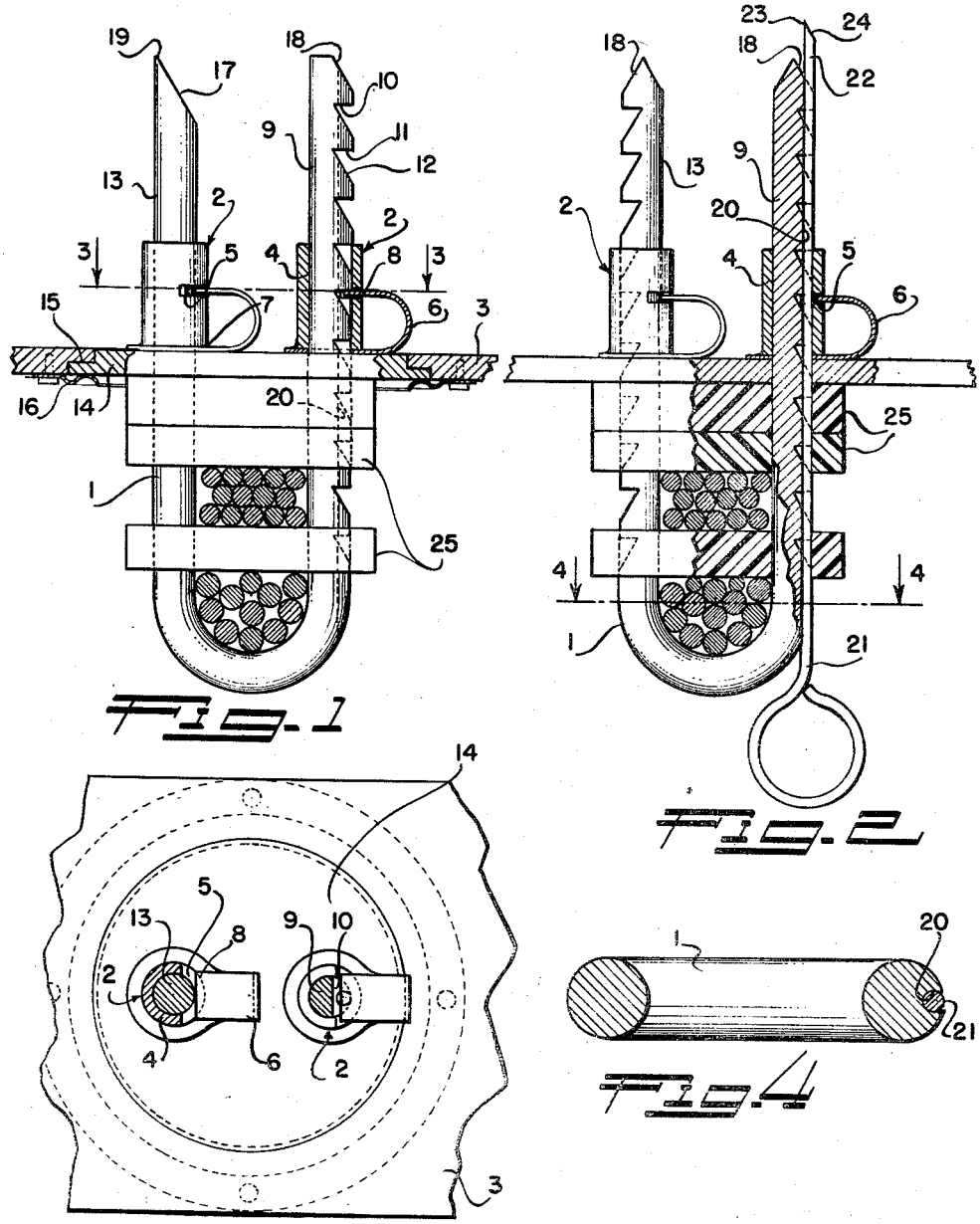
INVENTOR.
JAMES L. McFARLAND
BY
George C. Sullivan
Agent

United States Patent Office 2,931,607
Patented Apr. 5, 1960

2,931,607

QUICK RELEASE CABLE SUPPORT CLAMP

James L. McFarland, Burbank, Calif., assignor to Lockheed Aircraft Corporation, Burbank, Calif.

Application October 28, 1955, Serial No. 543,340

4 Claims. (Cl. 248—68)

This invention relates generally to clamps and more particularly to a so-called "jimmy" type quick release harness clamp for attaching wire or plumbing lines to supporting structure such as an airframe.

In many different structures, but particularly in aircraft, it is necessary to provide support for large numbers of wire and plumbing lines so they will be protected against damage and kept out of the way. The conventional line supporting clamp which is used almost exclusively in the aircraft industry consists of an insulated strap and a screw or bolt which is inserted through openings in the ends of the strap for attachment to supporting structure. The strap when wrapped around a plurality of wire or plumbing lines, holds them effectively and firmly in place. One serious drawback with the conventional clamp exists however; it is difficult to install and remove from the supporting structure. Because of this, numerous quick release type clamps have been devised in the past but for one reason or another they have never qualified as a replacement for the conventional clamp.

Accordingly, an object of this invention is to provide a quick release clamp which, because of its reliability and versatility may, in most all applications replace the conventional strap type wire and tubing clamp.

Another object of this invention is to provide a quick release clamp which will permit attaching wire or plumbing lines to supporting structure without the use of tools. Removal of the clamp from a positive attachment with the supporting structure requires simply the insertion of a rod through a keyway provided in the clamp whereby lines may be quickly and easily removed, added or replaced from the bundle held by the clamp.

Another object of this invention is to provide a quick release clamp which is universal in size over a limited range and which will readily permit segregating lines from each other for purposes of radio interference elimination and the like.

Another object of this invention is to provide a quick release clamp which will conveniently allow spacing wire bundles away from sharp edges on the supporting structure.

Still another object of this invention is to provide a quick release clamp which by virtue of its construction details will prevent improper installation thereof and which will not loosen when subjected to vibrations. Since no tools are required to make a positive attachment and since improper installation is avoided by virtue of the construction details, the clamp may be dependably used where the supporting structure is hidden such as behind an insulation blanket or where only one side of the supporting panel is accessible.

Further and other objects will become apparent from a reading of the following description especially when considered in combination with the accompanying drawing wherein like numerals refer to like parts.

In the drawing:

Figure 1 is a view showing a typical installation of the quick release clamp;

Figure 2 is a fragmentary view showing a modification of the quick release clamp of Figure 1;

Figure 3 is a sectional view of the clamp taken on line 3—3 of Figure 1; and

Figure 4 is a sectional view taken on line 4—4 of Figure 2.

Referring to Figure 1 the complete clamp includes a staple 1 and a pair of like receptacles 2 which are secured to a suitable mounting bracket 3. Each receptacle 2 includes a sleeve 4 having a transverse slot 5 cut therein intermediate of the ends of the sleeve. A spring 6 is secured to the base 7 of each sleeve 4 and bent or curved around so that its free end 8 extends through slot 5 and into sleeve 4. The slot allows substantial movement of the free end of spring 6 only in a radial direction relative to the sleeve. The two elements, sleeve 4 and spring 6 make up receptacle 2 which serves to engage and positively attach staple 1 to mounting bracket 3. Any suitable means such as welding may be employed to secure the receptacle to the mounting bracket.

Staple 1 comprises a U-shaped rod preferably, though not necessarily, circular in cross section as shown in Figures 3 and 4. In the Figure 1 configuration only one leg 9 of staple 1 is provided with a plurality of teeth formed by V-shaped notches 10 which are equally spaced substantially throughout the length of the leg for receiving the free end 8 of spring 6 which projects through sleeve 4 of the receptacle. One surface 11 of notches 10 is generally normal to the axis of leg 9 while the other surface 12 slopes outwardly to form a sawtooth-like recess whereby the staple may be inserted in the receptacle by pushing but cannot be withdrawn without first retracting spring 6.

To simplify removal of staple 1 from mounting bracket 3 and provide a quick release clamp, the other leg 13 of the staple in the Figure 1 version is not notched as is leg 9. The receptacle for the smooth leg merely acts to provide additional rigidity to the clamp. This arrangement results in a clamp with ample strength for the great majority of applications, however, where greater strength is required, both legs of the staple may be notched to engage the receptacles as shown in Figure 2 without departing from the teachings of the invention.

It is sometimes desirable that a clamp of this type be rotatable relative to its supporting structure. This may be accomplished, as shown in Figures 1 and 3, by mounting the receptacle on a circular plate 14 which is suitably notched on the edge as at 15 to be supported by bracket 3 with the use of a retaining ring 16. By employing a close fit between disc 14 and bracket 3 the former member is firmly held in position as a part of the supporting structure and yet is rotatable to facilitate use of the clamp.

The normal application for wire and plumbing line clamps in aircraft requires that they be arranged in series so that substantially all the lines may be confined to a single section of the fuselage. This facilitates installation and maintenance of the equipment and is otherwise beneficial from a safety standpoint. Therefore, clamp mounting bracket 3 may often take the form of a strip which carries a series of equally spaced receptacles. Such a mounting strip should be made for securing to fixed structure in the aircraft by suitable means such as riveting.

Often in aircraft only the front side of the mounting strip will be visible and in some instances even the front side will be hidden by insulation blankets or the like. With the receptacle in an obscure location such as mentioned above it is not practical to require an inspection of the receptacles to determine whether the staple legs are inverted and thus not properly engaged with the receptacles. With but one leg of the staple being notched as in Figure 1 and with the receptacles being arranged so that any pair of the plurality is suitable for receiving the staple, it is necessary to provide means preventing assembling the clamp so that the notches are not in engagement with the spring latch on the receptacle.

This may be readily accomplished by beveling the tip 17 of leg 13 on staple 1 so that it will form a point 19 on the outside edge of the leg whereby insertion of the staple in the inverted position will cause tip 17 to strike the tip end of spring 6 which projects into sleeve 4. The staple is thereby blocked since no force is applied to the spring causing it to retract as in the case when the staple is properly inserted. The beveled surface 18 on the outside edge of the tip of leg 9 effectively causes retraction of spring 6 for insertion of the staple when it is properly arranged.

Improper assembly of the clamp may also be prevented by providing notches 10 in both legs of the staple as shown in Figure 2 rather than merely in one as shown in Figure 1. In the Figure 2 version, both legs are identical so that insertion of the staple into the receptacles must result in spring 6 engaging the notches formed in one of the legs of the staple. The other staple leg, as in the Figure 1 configuration, is not locked by the associated receptacle.

Removal of staple 1 from receptacles 4 in either the Figure 1 or Figure 2 configuration is readily accomplished by providing a keyway or groove 20 in the notched leg of the staple which extends axially of the leg and intersects each notch. The groove, which penetrates the leg to a depth substantially equal to that of the notches, is adapted to receive a spring release rod 21. The tip end 22 of rod 21 as best shown in Figure 2 is tapered or beveled to provide a sharp point 23 at the tip of the rod and an inclined surface 24 extending from point 23 to the opposite side of the rod. By simply inserting rod 21 in groove 20, the beveled edge 24 on the rod effects retraction of spring 6 from within receptacle sleeve 4 in a manner similar to that of beveled surface 18 on the notched legs of the staple. Staple 1 is thereby released and may be easily withdrawn from the receptacle.

Where it is desired to provide an insulated clamp for use with electrical lines, the staple may be formed of a dielectric material or it may be coated with such a material. Complete electrical insulation and separation of lines may be conveniently accomplished through the additional use of spacer blocks 25 which may be made from a suitable insulating material, such as rubber.

As described hereinabove, the clamp may be assembled after installation of the receptacle mounting strip, by simply pushing staple 1 through the receptacle openings, allowing the tip end 8 of spring 6 which projects through slot 5 in sleeve 4 to engage one of the plurality of notches 10 formed in one of the staple legs. Thus a plurality of electrical and/or plumbing lines may be readily and securely clamped to supporting structure without the use of a single tool. The lines may be held as firmly as desired by the clamp through control of the force applied in inserting the staple into the receptacles.

Release of the staple for removing, adding to or replacing lines from the clamped bundle, may be accomplished by merely inserting spring release rod 21 into groove 20 formed in the locked leg of staple 1. Once the rod is shoved home, the staple may be readily withdrawn from the receptacle and supporting structure without damage.

Slot 5, provided in sleeve 4 of the receptacle, allows the tip end of spring 6 to move substantially only in a radial direction. Thus spring 6 will not deflect so as to allow staple 1 to loosen its grip on the bundle of lines clamped to the supporting bracket so long as the staple is locked, and this is true regardless of the allowable load applied. Vibrations which are apt to loosen the conventional clamp has no ill affect on the described quick release clamp. This makes it most useful in any clamp application and particularly in aircraft where dependability is so important.

It should be understood that certain alterations, modifications and substitutions may be made to the instant disclosure without departing from the spirit and scope of this invention as defined by the appended claims.

I claim:

1. A quick release clamp comprising, a staple, said staple having a pair of legs spaced apart in a generally parallel relationship, at least one of the legs on said staple having transverse notches formed therein throughout a substantial portion of the length thereof, a clamp mounting bracket having openings receiving the legs of said staple, a sleeve secured to said bracket and aligned with one of said openings and receiving a staple leg, said sleeve having a transverse slot formed therein intermediate of its ends, and a retainer spring having one end thereof projecting through said slot and into said sleeve and engaging a notch on the leg of said staple to thereby secure the staple to said mounting bracket, said staple having at least one groove formed therein intersecting said notches for receiving a tool to effect retraction of said retainer spring whereby the staple may be released from the mounting bracket.

2. A quick release clamp for attaching wire lines or the like to supporting structure comprising, a staple, said staple having a pair of legs spaced apart in a generally parallel relationship, one of the legs on said staple having a plurality of transverse notches formed therein, a clamp mounting bracket having openings receiving the legs of said staple, latch means secured to said bracket on the side opposite said staple and aligned with at least one of said openings, said latch means having a sleeve through which the notched leg of said staple projects, a transverse slot formed in said sleeve intermediate of the ends thereof, and a retainer spring having one end thereof projecting through said slot and into said sleeve and engaging a notch on the leg of said staple to secure the staple to said mounting bracket, said staple having a groove formed in the notched leg thereof which extends axially of the leg and intersects said notches whereby a tool may be inserted therein to effect retraction of said retainer spring to release the staple from the mounting bracket.

3. A quick release clamp for attaching wire lines or the like to supporting structure comprising, a staple, said staple having a pair of legs spaced apart in a generally parallel relationship, one of the legs on said staple having at least one transverse notch formed therein, a clamp mounting bracket having an opening receiving the notched leg of said staple, latch means secured to said bracket on the side opposite said staple and aligned with said opening, said latch means having a sleeve into which the notched leg projects, a transverse slot formed in said sleeve intermediate of the ends thereof, a retainer spring having one end thereof projecting through said slot and into said sleeve and engaging a notch on the leg of said staple to secure the staple to said mounting bracket, and cam means formed on the end of the notched leg of said staple for automatically retracting said retainer spring when inserting the staple, the notched leg of said staple having a groove formed therein which intersects the retainer spring engaging notch to receive a tool and effect retraction of said retainer spring to release the staple from the mounting bracket.

4. A quick release clamp for attaching wire or plumbing lines to supporting structure comprising, a staple, said staple having a pair of legs spaced apart in a generally parallel relationship, at least one of the legs on said staple having at least one transverse notch formed therein, a clamp mounting bracket having openings receiving the legs of said staple, sleeves secured to said bracket and aligned with said openings and receiving the legs of said staple, at least one of said sleeves having a transverse slot formed therein intermediate of its ends, a retainer spring having one end thereof projecting through said slot and into said sleeve and engaging a notch on said staple to secure said staple to the mounting bracket, and cam means formed on the end of at least one of the legs for automatically retracting said retainer spring when inserting the staple, said staple having at least one groove formed therein intersecting each notch for receiving a tool to effect the retraction of said retainer spring and release the staple from the mounting bracket.

References Cited in the file of this patent

UNITED STATES PATENTS

| | | |
|---|---|---|
| 1,172,051 | Rogers | Feb. 15, 1916 |
| 1,343,279 | Reynolds | June 15, 1920 |
| 1,755,201 | Blackburn et al. | Apr. 22, 1930 |
| 2,471,291 | Soref | May 24, 1949 |
| 2,495,610 | Smith | Jan. 24, 1950 |

FOREIGN PATENTS

| | | |
|---|---|---|
| 679,938 | Germany | Aug. 17, 1939 |